United States Patent
Ito et al.

(10) Patent No.: US 8,810,890 B2
(45) Date of Patent: Aug. 19, 2014

(54) OPTICAL SYSTEM FOR LASER OPTICAL RECTIFICATION AND WAVE FRONT CONTROL

(75) Inventors: Haruyasu Ito, Hamamatsu (JP); Takashi Yasuda, Hamamatsu (JP)

(73) Assignee: Hamamatsu Photonics K.K., Hamamatsu-shi, Shizuoka (JP)

(*) Notice: Subject to any disclaimer, the term of this patent is extended or adjusted under 35 U.S.C. 154(b) by 38 days.

(21) Appl. No.: 13/809,468

(22) PCT Filed: Jul. 13, 2011

(86) PCT No.: PCT/JP2011/065973
§ 371 (c)(1),
(2), (4) Date: Jan. 10, 2013

(87) PCT Pub. No.: WO2012/017788
PCT Pub. Date: Feb. 9, 2012

(65) Prior Publication Data
US 2013/0107346 A1 May 2, 2013

(30) Foreign Application Priority Data
Aug. 3, 2010 (JP) ................................. 2010-174688

(51) Int. Cl.
*G02F 1/01* (2006.01)
(52) U.S. Cl.
USPC ......................................... 359/277; 359/238
(58) Field of Classification Search
USPC ............... 359/237, 238, 276, 278; 219/121.6, 219/121.61, 121.74
See application file for complete search history.

(56) References Cited

U.S. PATENT DOCUMENTS

| 6,198,069 B1* | 3/2001 | Hackel et al. .............. 219/121.6 |
| 8,526,091 B2* | 9/2013 | Ito et al. ...................... 359/238 |
| 2012/0206786 A1* | 8/2012 | Ito et al. ...................... 359/238 |

FOREIGN PATENT DOCUMENTS

| JP | 2007-310368 | 11/2007 |
| JP | 2008-49393 | 3/2008 |
| JP | 2009-34723 | 2/2009 |
| JP | 2010-75997 | 4/2010 |
| JP | 2010-125507 | 6/2010 |

* cited by examiner

*Primary Examiner* — Loha Ben
(74) *Attorney, Agent, or Firm* — Drinker Biddle & Reath LLP

(57) ABSTRACT

A laser light shaping and wavefront controlling optical system 1 in accordance with an embodiment of the present invention comprises an intensity conversion lens 24 for converting and shaping an intensity distribution of laser light incident thereon into a desirable intensity distribution; an optical modulation device 34 for modulating the laser light emitted from the intensity conversion lens 24 so as to control a wavefront thereof; a condenser optical system 36 for converging the laser light issued from the optical modulation device 34; and an image-forming optical system 30, arranged between the optical modulation device 34 and the condenser optical system 36, having an entrance-side imaging plane between a plane 24x where the laser light emitted from the intensity conversion lens 24 attains the desirable intensity distribution and a modulation plane 34a of the optical modulation device 34 and an exit-side imaging plane on a pupil plane 36a of the condenser optical system 36.

3 Claims, 16 Drawing Sheets

(a)

(b)

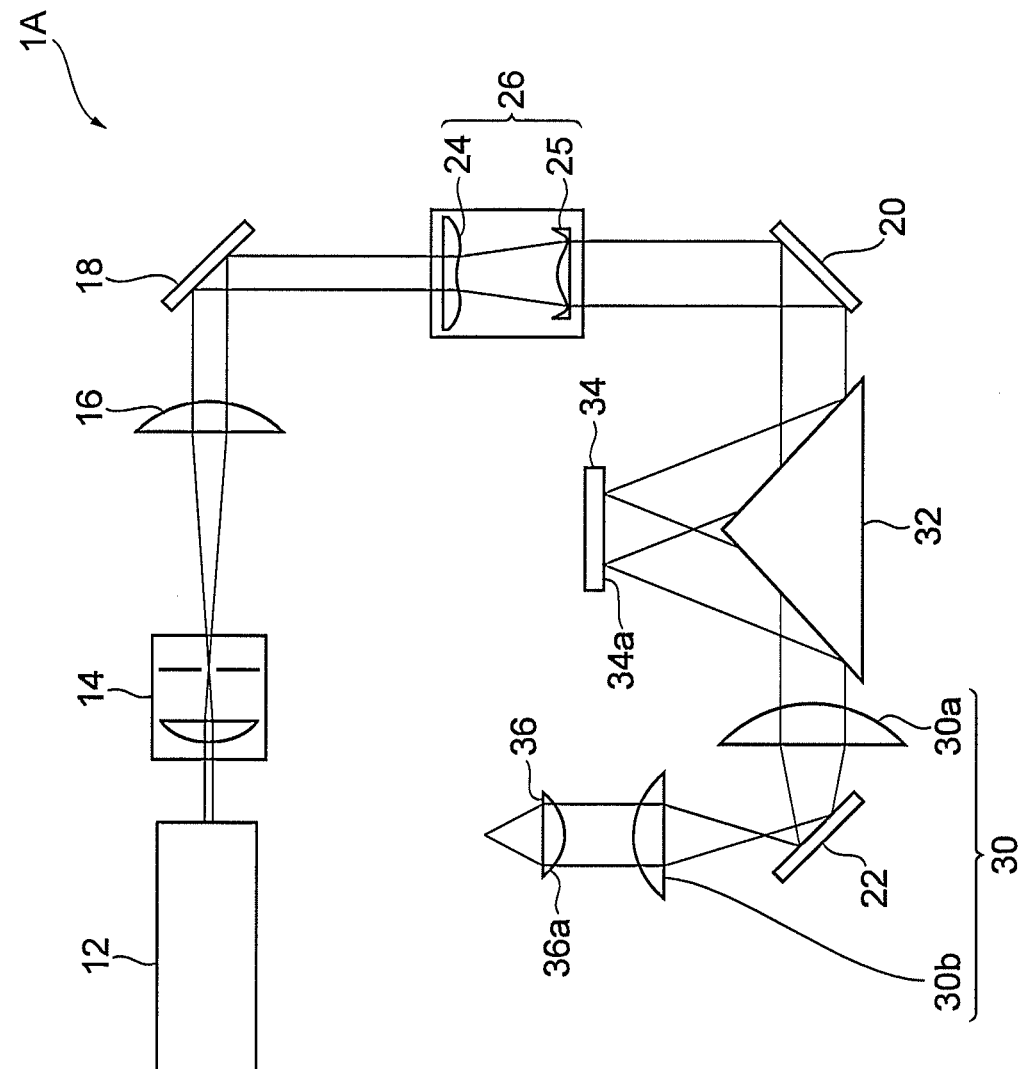

OPTICAL SYSTEM FOR LASER OPTICAL RECTIFICATION AND WAVE FRONT CONTROL

TECHNICAL FIELD

The present invention relates to an optical system which shapes an intensity distribution of laser light into a given intensity distribution and also controls a wavefront of the laser light.

BACKGROUND ART

Laser light typically has an intensity distribution which is the strongest near its center and gradually becomes weaker toward peripheries as in a Gaussian distribution. However, laser light having a spatially uniform intensity distribution has been desired for laser processing and the like. In this regard, Patent Literature 1 discloses, as a laser light shaping optical system for shaping an intensity distribution of laser light into a spatially uniform intensity distribution, one comprising an aspherical lens type homogenizer. The laser light shaping optical system disclosed in Patent Literature 1 further comprises a transfer lens system (image-forming optical system) immediately behind the homogenizer in order to solve the problem that the laser light emitted from the homogenizer is distorted according to its propagated distance.

On the other hand, it is desirable for laser processing and the like to be able to perform fine processing. When forming a modified layer such as an optical waveguide, for example, converging points are desired to be as small as possible. When the processing position is deeper, however, aberrations (wavefront distortions) cause converging regions to expand, thereby making it harder to keep a favorable processing state. In this regard, Patent Literatures 2 and 3 disclose, as an optical system for correcting aberrations of laser light, i.e., as a wavefront controlling optical system for controlling the wavefront of laser light, one comprising a spatial light modulator (SLM). The wavefront controlling optical system disclosed in Patent Literature 2 further comprises an adjustment optical system (image-forming optical system) between the SLM and a condenser optical system in order for the SLM and the condenser optical system to yield the same wavefront form.

CITATION LIST

Patent Literature

Patent Literature 1: Japanese Patent Application Laid-Open No. 2007-310368
Patent Literature 2: Japanese Patent Application Laid-Open No. 2009-034723
Patent Literature 3: Japanese Patent Application Laid-Open No. 2010-075997

SUMMARY OF INVENTION

Technical Problem

The inventors tried to shape the intensity distribution of laser light to a spatially uniform intensity distribution and control the wavefront of the laser light at the same time. However, placing an SLM between the homogenizer and the image-forming optical system in the laser light shaping optical system disclosed in Patent Literature 1, in which the entrance-side imaging plane of the image-forming optical system is set on the exit surface of the homogenizer, fails to form the output image of the SLM in the condenser optical system, whereby wavefront control (aberration correction) is not performed sufficiently.

On the other hand, placing a homogenizer in front of the SLM in the wavefront controlling optical system disclosed in Patent Literature 2, in which the entrance-side imaging plane of the image-forming optical system is set on the modulation plane of the SLM, fails to form the output image of the homogenizer in the condenser optical system, thereby distorting the intensity distribution of the shaped laser light.

It is therefore an object of the present invention to provide a laser light shaping and wavefront controlling optical system which can easily shape the intensity distribution of laser light into a given intensity distribution and control the wavefront of the laser light at the same time.

Solution to Problem

The laser light shaping and wavefront controlling optical system in accordance with the present invention comprises an intensity conversion lens for converting and shaping an intensity distribution of laser light incident thereon into a desirable intensity distribution; an optical modulation device for modulating the laser light emitted from the intensity conversion lens so as to control a wavefront thereof; a condenser optical system for converging the laser light issued from the optical modulation device; and an image-forming optical system, arranged between the optical modulation device and the condenser optical system, having an entrance-side imaging plane between a plane where the laser light emitted from the intensity conversion lens attains the desirable intensity distribution and a modulation plane of the optical modulation device and an exit-side imaging plane in the condenser optical system.

Since the image-forming optical system has the entrance-side imaging plane between a plane where the laser light emitted from the intensity conversion lens attains the desirable intensity distribution and the modulation plane of the optical modulation device, the laser light shaping and wavefront controlling optical system can transfer both of the desirable intensity distribution shaped by the intensity conversion lens and the wavefront controlled by the optical modulation device to the condenser optical system. Therefore, it can easily shape the intensity distribution of laser light into a given intensity distribution and control the wavefront of the laser light at the same time.

Here, the intensity conversion lens, which shapes the intensity distribution of the laser light incident thereon, changes the wavefront of the incident laser light (i.e., the phase of the incident laser light) at the same time. By utilizing the change in wavefront (aberration) caused by the intensity conversion lens, the laser light shaping and wavefront controlling optical system can improve the wavefront control resolution as compared with the case where the wavefront control is performed by the optical modulation device alone.

The plane where the laser light emitted from the intensity conversion lens attains the desirable intensity distribution may be located on the modulation plane of the optical modulation device, while the image-forming optical system may have the entrance-side imaging plane on the modulation plane of the optical modulation device.

This structure can transfer the desirable intensity distribution shaped by the intensity conversion lens and the wavefront controlled by the optical modulation device to the condenser optical system more precisely.

The laser light shaping and wavefront controlling optical system may further comprise a phase correction lens, arranged on the plane where the laser light emitted from the intensity conversion lens attains the desirable intensity distribution, for correcting the laser light emitted from the intensity conversion lens into a plane wave by homogenizing a phase thereof.

This structure can also transfer the desirable intensity distribution shaped by the intensity conversion lens and the wavefront controlled by the optical modulation device to the condenser optical system. Therefore, it can easily shape the intensity distribution of laser light into a given intensity distribution and control the wavefront of the laser light at the same time.

As mentioned above, the structure equipped with the intensity conversion lens alone without the phase correction lens can utilize the wavefront change caused by the intensity conversion lens and is effective in correcting aberrations. However, when no aberration correction is necessary, as in the case of multipoint-processing a material surface, the structure further comprising the phase correction lens is effective. When the structure using the intensity conversion lens alone is employed in the case of multipoint-processing a material surface, it is necessary for the optical modulation device to correct the wavefront change caused by the intensity conversion lens and control the wavefront change for forming multiple points. This increases the amount of wavefront control achieved by the optical modulation device.

In the structure further comprising the phase correction lens, by contrast, the phase correction lens corrects the laser light issued from the intensity conversion lens into the plane wave by homogenizing the phase thereof, whereby it is only necessary for the optical modulation device to attain the wavefront change for forming the multiple points. Therefore, the amount of wavefront control achieved by the optical modulation device does not increase.

Advantageous Effects of Invention

The present invention can easily shape the intensity distribution of laser light into a given intensity distribution and control the wavefront of the laser light at the same time.

BRIEF DESCRIPTION OF DRAWINGS

FIG. 16 is a structural diagram illustrating the laser light shaping and wavefront controlling optical system in accordance with a second embodiment of the present invention.

DESCRIPTION OF EMBODIMENTS

Figure 1:
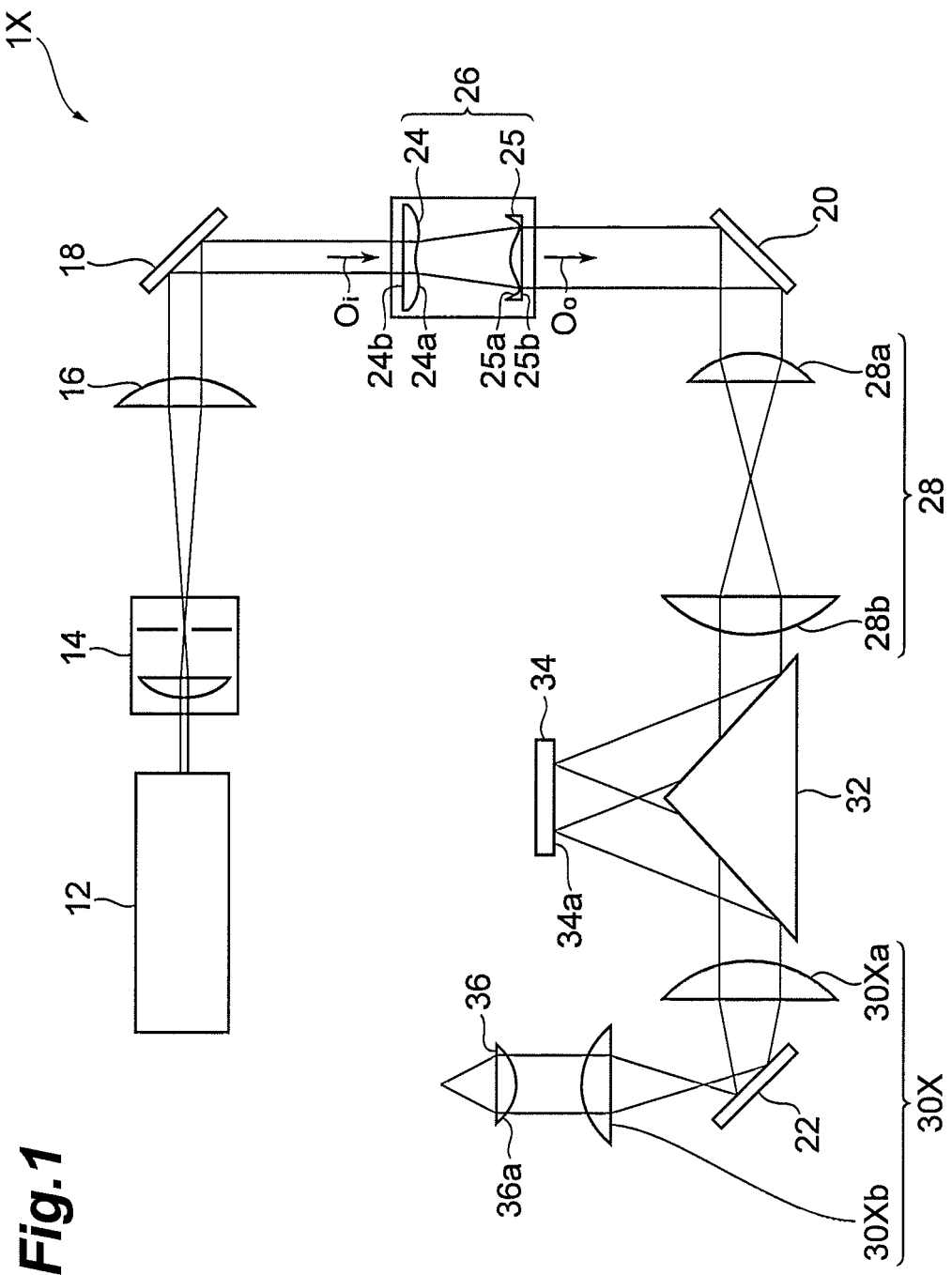
FIG. 1 is a structural diagram illustrating the laser light shaping and wavefront controlling optical system in accordance with a first comparative example of the present invention.

In the following, preferred embodiments of the present invention will be explained in detail with reference to the drawings. In the drawings, the same or equivalent parts will be referred to with the same signs.

Comparative examples of the present invention will be explained before embodiments thereof. Contrived in the first comparative example is a mode comprising a homogenizer for shaping the intensity distribution of laser light, a spatial light modulator (optical modulation device, hereinafter referred to as SLM) for controlling the wavefront of the laser light, and two image-forming optical systems for transferring the intensity distribution shaped by the homogenizer and the wavefront controlled by the SLM to a given position.

First Comparative Example

FIG. 1 is a structural diagram illustrating the laser light shaping and wavefront controlling optical system in accordance with a first comparative example of the present invention. The laser light shaping and wavefront controlling optical system 1X in accordance with the first comparative example comprises a laser light source 12, a spatial filter 14, a collimator lens 16, reflecting mirrors 18, 20, 22, a homogenizer 26, image-forming optical systems 28, 30X, a prism 32, an SLM 34, and a condenser lens (condenser optical system) 36.

An example of the laser light source 12 is an Nd:YAG laser. The spatial filter 14 comprises an objective lens with a power of 10× and a pinhole whose diameter $\Phi=50$ μm, for example. An example of the collimator lens 16 is a plano-convex lens. Thus, laser light emitted from the laser light source 12 passes through the spatial filter 14 and collimator lens 16, thereby shaping its intensity distribution into a concentric Gaussian distribution (Oi in FIG. 2). The laser light having shaped its intensity distribution changes its direction by 90° with the reflecting mirror 18, so as to be made incident on the homogenizer 26.

The homogenizer 26 is used for shaping the intensity distribution of the laser light into a given form. The homogenizer 26 comprises a pair of aspherical lenses 24, 25. In the homogenizer 26, the entrance-side aspherical lens 24 functions as an intensity conversion aspherical lens for shaping the intensity distribution of the laser light into a given form, while the exit-side aspherical lens 25 functions as a phase correction aspherical lens for correcting the shaped laser light into a plane wave by homogenizing a phase thereof. By designing the forms of the aspheric surfaces in the pair of aspherical lenses 24, 25, this homogenizer 26 can produce output laser light Oo having a desirable intensity distribution into which the intensity distribution of input laser light Oi is shaped.

The following will illustrate an example of designing the forms of the aspheric surfaces in the pair of aspherical lenses 24, 25 in the homogenizer 26. For example, the desirable intensity distribution is supposed to be set to a spatially uniform intensity distribution which is desired for laser processing apparatus, i.e., a super-Gaussian distribution (Oo in FIG. 2). Here, it is necessary for the desirable intensity distribution to be set such that the energy of the output laser light Oo (the area of the desirable intensity distribution) equals the energy of the input laser light Oi (the area of the intensity distribution). Hence, the super-Gaussian distribution is set as follows, for example.

Figure 2:
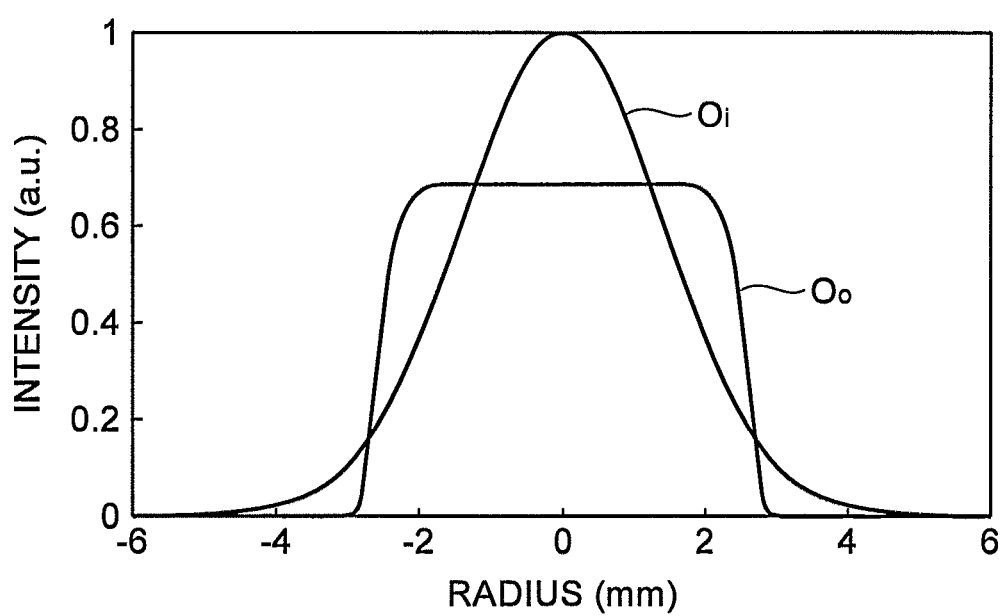
FIG. 2 is a chart illustrating an example of intensity distributions of input laser light in a homogenizer and an example of desirable intensity distributions of output laser light.

As illustrated in FIG. 2, the intensity distribution of the input laser light Oi is a concentric Gaussian distribution (wavelength: 1064 nm; beam diameter: 5.6 mm at $1/e^2$; $\omega$=2.0 mm). Since the Gaussian distribution is represented by the following expression (1), the energy of the input laser light Oi within the range of a radius of 6 mm is obtained by the following expression (2):

[Math. 1]
$$I_1(r) = \exp\left\{-\left(\frac{r}{\omega}\right)^2\right\} \quad (1)$$

[Math. 2]
$$\int_{-6}^{6} I_1(r)\,dr = 1.76689 \quad (2)$$

In this case, the Gaussian distribution is rotationally symmetric about a radius of 0 mm, whereby the aspheric surface form is designed by one-dimensional analysis.

On the other hand, the desirable intensity distribution of the output laser light Oo is set to a super-Gaussian intensity distribution (order N=8, $\omega$=2.65 mm) as illustrated in FIG. 2. Since the super-Gaussian distribution is represented by the following expression (3), the value of the uniform intensity part of the output laser light Oo is set as $E_0$=0.687 in order for the energy within the radius of 6 mm of the output laser light Oo to equal the energy of the input laser light Oi as in the following expression (4):

[Math. 3]
$$I_2(r) = E_0 \times \exp\left\{-\left(\frac{r}{\omega}\right)^{2N}\right\} \quad (3)$$

[Math. 4]
$$\int_{-6}^{6} I_1(r)\,dr = \int_{-6}^{6} I_2(r)\,dr \quad (4)$$

According to this technique, the desirable intensity distribution of the shaped output laser light can not only follow a specified function, but also become a given intensity distribution.

Figure 3:
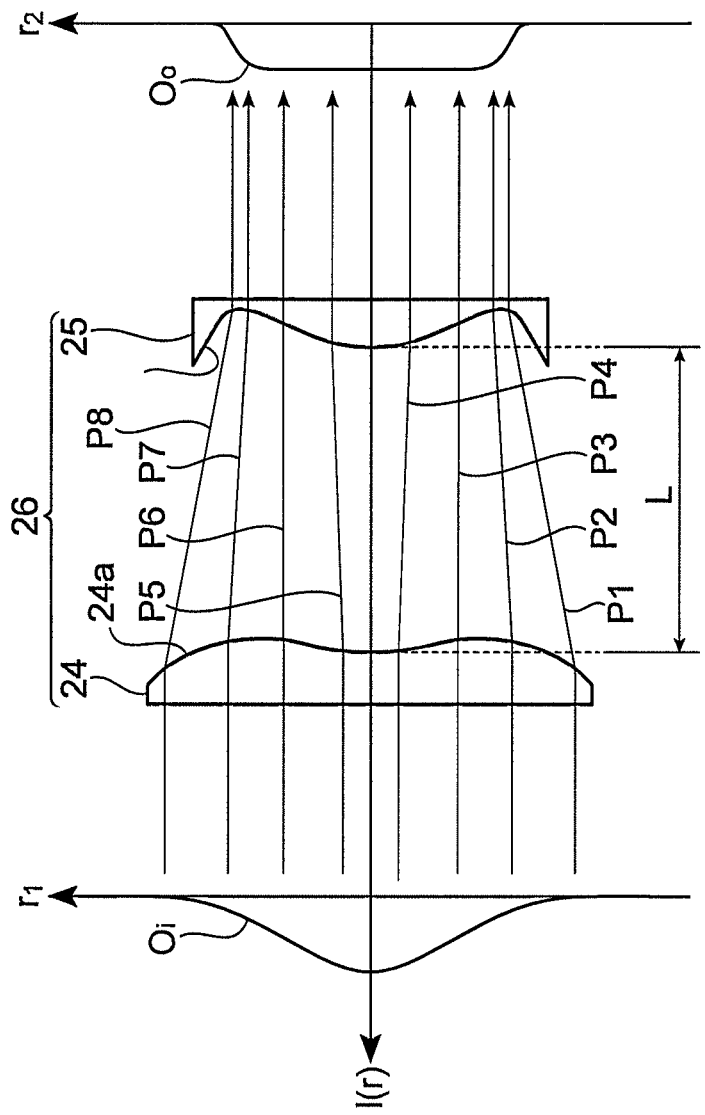
FIG. 3 is a schematic diagram for specifying optical paths between aspherical lenses in the homogenizer.

Subsequently, as illustrated in FIG. 3, optical paths P1 to P8 which are optical paths from the aspheric surface 24a of the intensity conversion aspherical lens 24 to the aspheric surface 25a of the phase correction aspherical lens 25 at given coordinates in radial directions of the aspherical lenses are determined such that the intensity distribution in the input laser light Oi at the intensity conversion aspherical lens 24 becomes the desirable intensity distribution in the output laser light Oo at the phase correction aspherical lens 25.

Thereafter, according to thus determined optical paths P1 to P8, the form of the aspheric surface 24a of the intensity conversion lens 24 is determined. Specifically, with reference to the center of the intensity conversion aspherical lens 24, the difference in height of the aspheric surface 24a is determined at each coordinate in the radial direction $r_1$ so as to yield the optical paths P1 to P8. Thus, the form of the aspheric surface 24a of the intensity conversion aspherical lens 24 is determined as illustrated in FIG. 4.

On the other hand, the form of the aspheric surface 25a of the phase correction aspherical lens 25 is determined such as to make the laser light have a uniform phase on the optical paths P1 to P8 and become a plane wave. Specifically, with reference to the center of the phase correction aspherical lens 25, the difference in height of the aspheric surface 25a is determined at each coordinate in its radial direction $r_2$. Thus, the form of the aspheric surface 25a of the phase correction aspherical lens 25 is determined as illustrated in FIG. 5.

Figure 4:
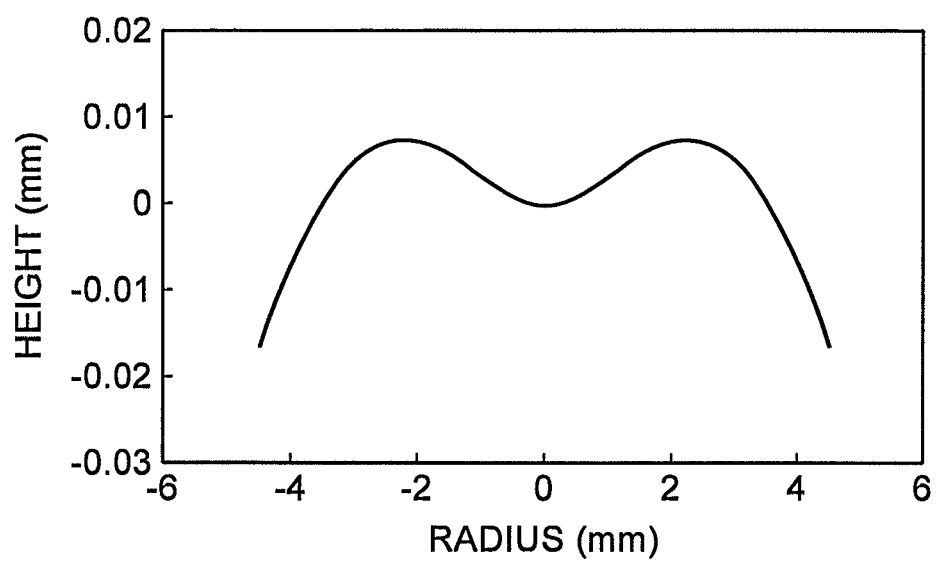
FIG. 4 is a chart illustrating an example of forms of an intensity conversion aspherical lens.
Figure 5:
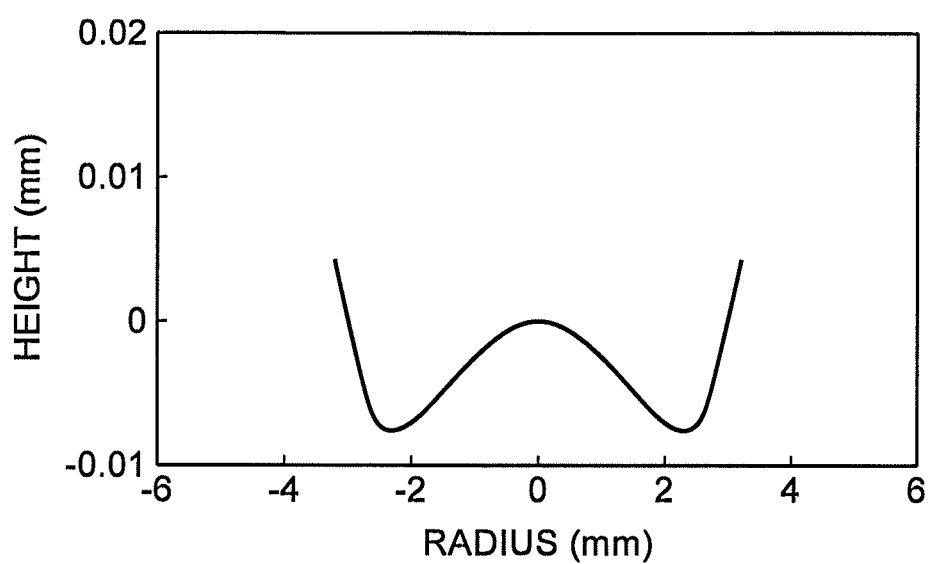
FIG. 5 is a chart illustrating an example of forms of a phase correction aspherical lens.

FIGS. 4 and 5 illustrate an example of designing in which $CaF_2$ (n=1.42) is used as a material for the aspherical lenses 24, 25, while the distance between the center position (where coordinate $r_1$=0) of the aspheric surface 24a and the center position (where coordinate $r_2$=0) of the aspheric surface 25a is set as L=165 mm.

Returning to FIG. 1, the laser light Oo shaped into the desirable intensity distribution by the homogenizer 26 changes its direction by 90° with the reflecting mirror 20, so as to be made incident on the image-forming optical system 28.

The image-forming optical system 28 has a pair of lenses 28a, 28b and forms an image of the laser light on the entrance-side imaging plane onto the exit-side imaging plane. The entrance-side imaging plane of the image-forming optical system 28 is set on the exit surface of the homogenizer 26, i.e., the exit surface 25b of the phase correction aspherical lens 25, while its exit-side imaging plane is set on a modulation plane 34a of the SLM 34. The image-forming optical system 28 may function as a magnifying or reducing optical system for adjusting the beam diameter of the laser light on the entrance-side imaging plane to the size of the modulation plane 34a of the SLM 34. This makes it possible to utilize the pixel region in the modulation plane 34a of the SLM 34 effectively. The laser light issued from the image-forming optical system 28 is made incident on the prism 32.

The prism 32 turns the direction of the laser light incident thereon, so as to make it incident on the SLM 34, and turns the direction of the laser light from the SLM 34, so as to make it incident on the image-forming optical system 30.

The SLM 34, an example of which is an LCOS-SLM (Liquid Crystal on Silicon-Spatial Light Modulator), modulates the phase of the laser light emitted from the prism 32, so as to perform wavefront control. For example, a correction wavefront for correcting the spherical aberration occurring within a transparent medium is set in the case where the inside of the transparent medium is processed by the laser light converged by the condenser lens 36.

The image-forming optical system 30X has a pair of lenses 30Xa, 30Xb and forms an image of the laser light on the entrance-side imaging plane onto the exit-side imaging plane. The entrance-side imaging plane of the image-forming optical system 30X is set on the modulation plane 34a of the SLM 34, while its exit-side imaging plane is set on a pupil plane 36a of the condenser lens 36. In this mode, the reflecting mirror 22 is arranged between the lenses 30Xa, 30Xb. The image-forming optical system 30X may function as a magnifying or reducing optical system for adjusting the beam diameter of the laser light on the entrance-side imaging plane to the pupil diameter on the pupil plane 36a of the condenser lens 36. This can efficiently guide the laser light to the condenser lens 36.

The condenser lens 36 converges the laser light from the image-forming optical system 30X at a desirable position, e.g., a processing position within a transparent medium.

The laser light shaping and wavefront controlling optical system 1X in accordance with the first comparative example can precisely transfer the intensity distribution shaped by the homogenizer 26 to the pupil plane 36a of the condenser lens 36 through the image-forming optical systems 28, 30X, and the wavefront controlled by the SLM 34 to the pupil plane 36a of the condenser lens 36 through the image-forming optical system 30X. Hence, it can shape the intensity distribution of laser light into a given intensity distribution and control the wavefront of the laser light at the same time.

Figure 6:
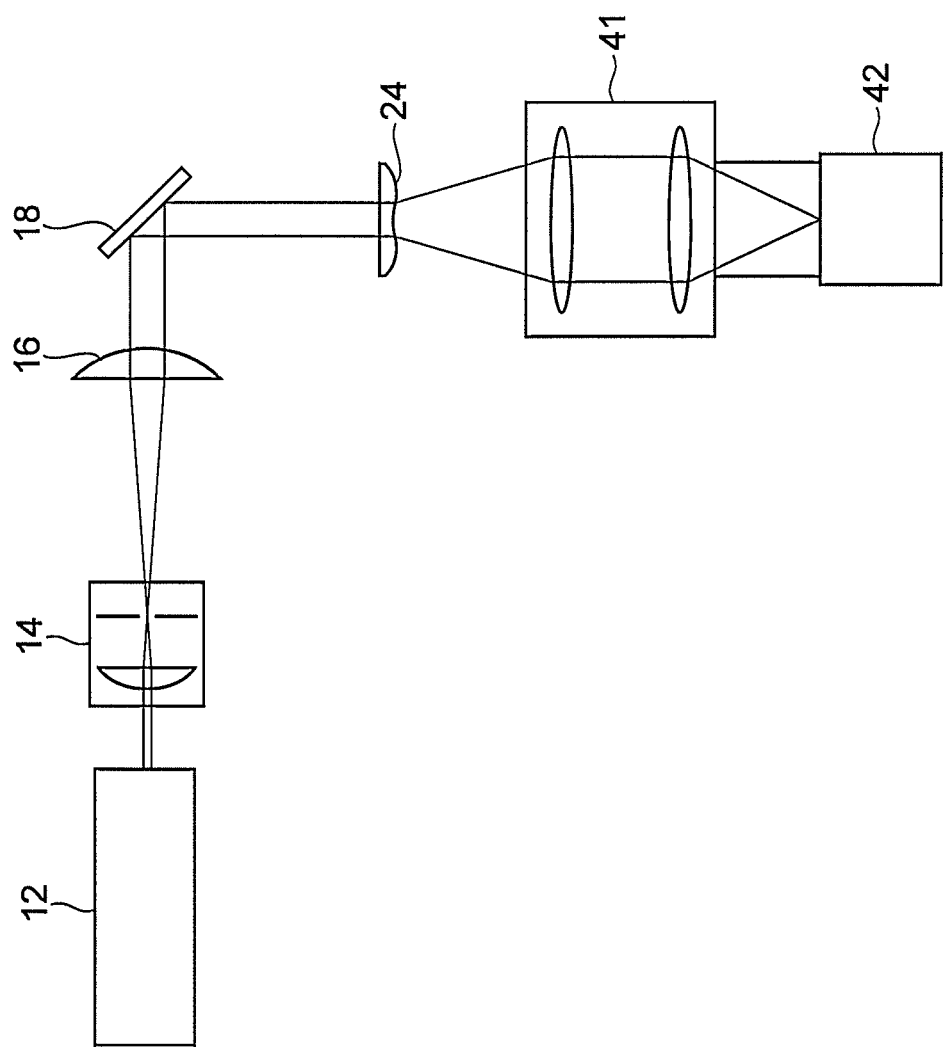
FIG. 6 is a diagram illustrating a measurement system for measuring the intensity distribution of the laser light emitted from the intensity conversion aspherical lens.
Figure 7:
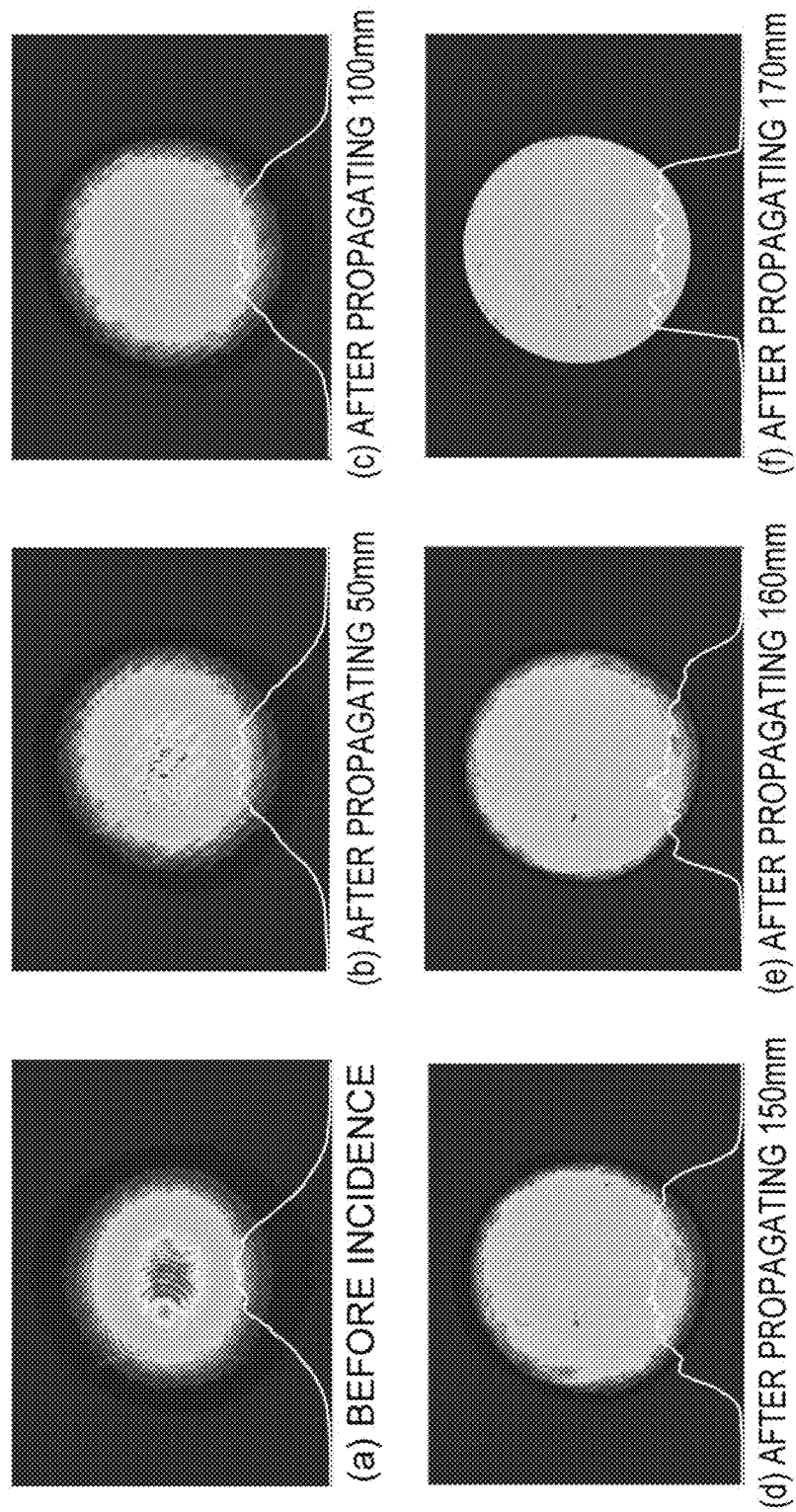
FIG. 7 is a set of charts illustrating results of measurement of intensity distributions in the laser light incident on the intensity conversion aspherical lens and the laser light emitted therefrom.

As illustrated in FIG. 6, the spatial mode (intensity distribution) of the laser light emitted from the intensity conversion aspherical lens 24 in the homogenizer 26 was measured by a beam profiler 42 through an image-forming lens system 41. The spatial mode (intensity distribution) of the laser light incident on the intensity conversion aspherical lens 24 was also measured by the image-forming lens system 41 and beam profiler 42. FIG. 7 illustrates results of these measurements.

FIG. 7(a) is the measurement result of the spatial mode (intensity distribution) of the laser light incident on the intensity conversion aspherical lens 24, while FIGS. 7(b) to (f) are measurement results of the spatial mode (intensity distribution) of the laser light emitted from the intensity conversion aspherical lens 24 and then propagated by 50 mm to 170 mm, respectively. From these results, the intensity conversion aspherical lens 24 was seen to shape the intensity distribution of the laser light into a spatially uniform intensity distribution, i.e., super-Gaussian distribution, substantially as designed after propagating about L=165 mm, which was a designed value of the lens interval.

It was also seen that the intensity distribution did not change drastically when the lens interval deviated from its designed value L=165 mm. These results indicate that the intensity distribution shaped by the intensity conversion aspherical lens 24 can be transferred to a given position through the image-forming optical systems even when the position where the desirable intensity distribution is obtained by the intensity conversion aspherical lens 24 does not precisely coincide with the entrance-side imaging plane of the image-forming optical system.

Hence contrived in the second comparative example is a mode excluding the phase correction aspherical lens in the homogenizer in the first comparative example.

Second Comparative Example

Figure 8:
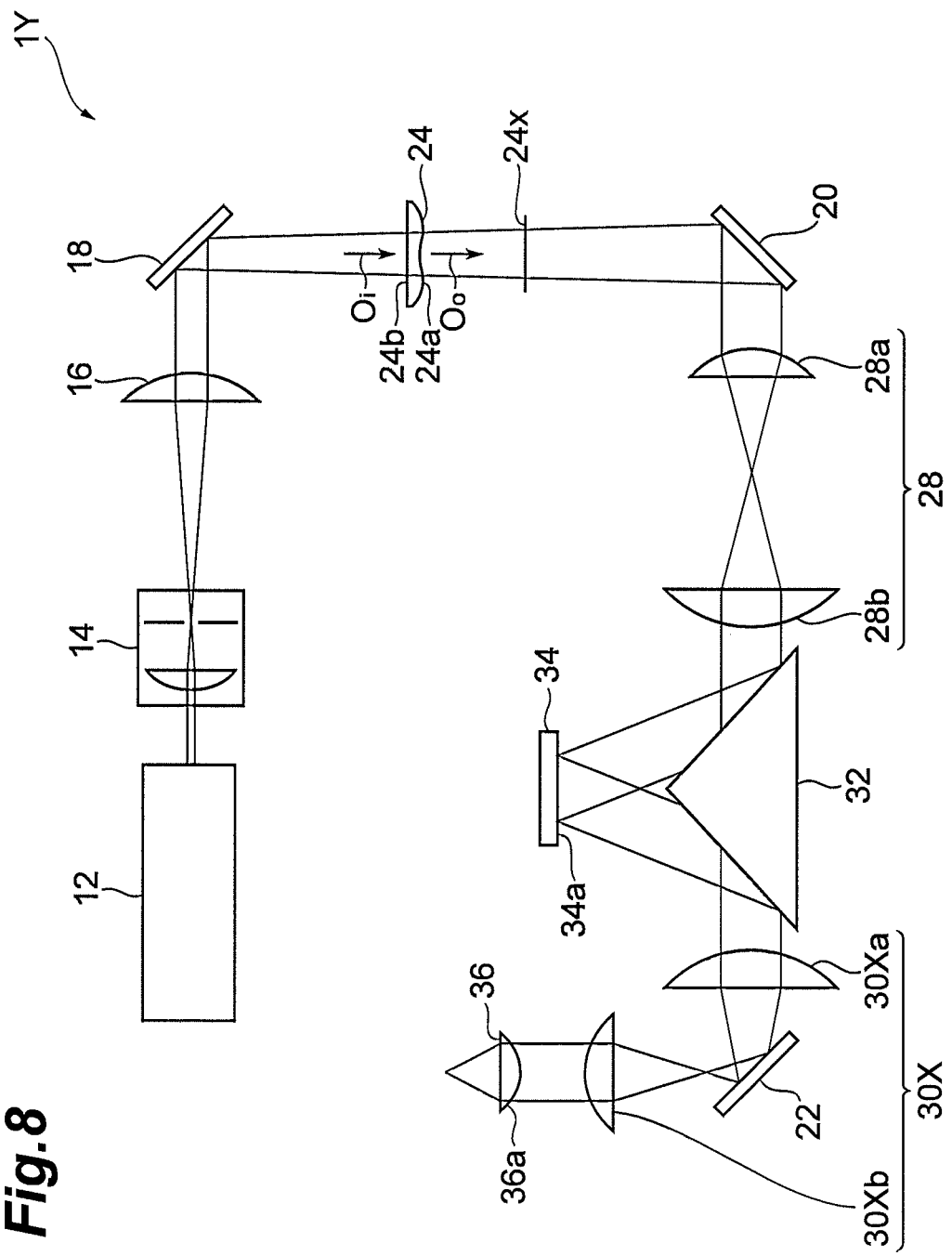
FIG. 8 is a structural diagram illustrating the laser light shaping and wavefront controlling optical system in accordance with a second comparative example of the present invention.

FIG. 8 is a structural diagram illustrating the laser light shaping and wavefront controlling optical system in accordance with the second comparative example of the present invention. The laser light shaping and wavefront controlling optical system 1Y in accordance with the second comparative example structurally differs from the laser light shaping and wavefront controlling optical system 1X in accordance with the first comparative example in that the intensity conversion aspherical lens 24 is provided alone in place of the homogenizer 26. The other structures of the laser light shaping and wavefront controlling optical system 1Y in accordance with the second comparative example are the same as those of the laser light shaping and wavefront controlling optical system 1 in accordance with the first comparative example.

As mentioned above, the intensity conversion aspherical lens 24 is used for shaping the intensity distribution of the laser light into a given form and can generate the output laser light Oo having a desirable intensity distribution into which the intensity distribution of the input laser light Oi is shaped according to the designed form of the aspheric surface 24a.

Figure 9:
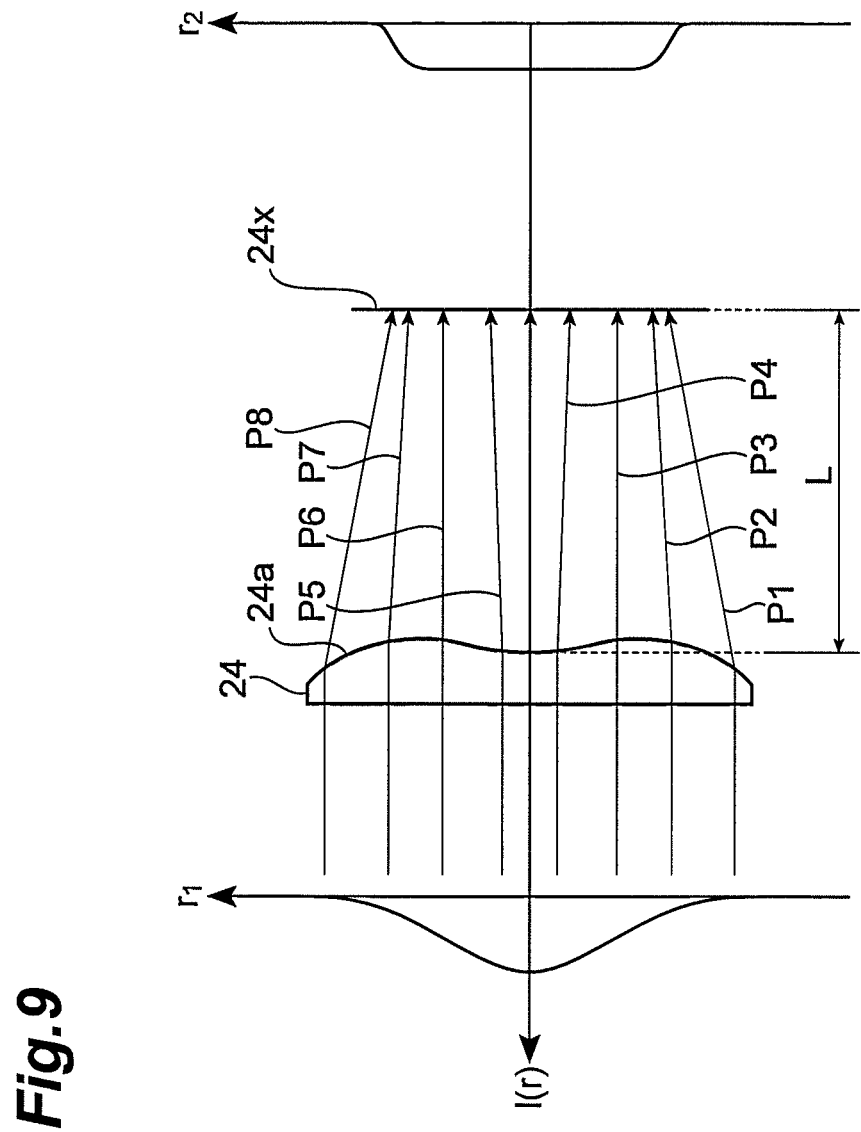
FIG. 9 is a schematic diagram for specifying optical paths of the laser light emitted from the intensity conversion aspherical lens.

For example, as illustrated in FIG. 9, optical paths P1 to P8 which are optical paths from the aspheric surface 24a of the intensity conversion aspherical lens 24 to a desirable plane 24x at given coordinates in the radial direction of the aspherical lens are determined such that the intensity distribution (Gaussian distribution as mentioned above) in the input laser light Oi at the intensity conversion aspherical lens 24 becomes the desirable intensity distribution (super-Gaussian distribution as mentioned above) in the output laser light Oo at the desirable plane 24x.

Thereafter, according to thus determined optical paths P1 to P8, the form of the aspheric surface 24a of the intensity conversion lens 24 is determined as mentioned above. Specifically, with reference to the center of the intensity conversion aspherical lens 24, the difference in height of the aspheric surface 24a is determined at each coordinate in the radial direction $r_1$ so as to yield the optical paths P1 to P8. Thus, the form of the aspheric surface 24a of the intensity conversion aspherical lens 24 is determined as illustrated in FIG. 4. Here, FIG. 4 illustrates an example of designing when the distance between the center position (position where the coordinate $r_1=0$) of the aspherical lens 24a and the desirable plane 24x is set as L=165 mm.

Returning to FIG. 8, the entrance-side imaging plane of the image-forming optical system 28 is set on the plane 24x where the laser light emitted from the intensity conversion aspherical lens 24 attains the desirable intensity distribution.

The laser light shaping and wavefront controlling optical system 1Y in accordance with the second comparative example can precisely transfer the intensity distribution, shaped by the intensity conversion aspherical lens 24, on the desirable plane 24x to the pupil plane 36a of the condenser lens 36 through the image-forming optical systems 28, 30X, and the wavefront controlled by the SLM 34 to the pupil plane 36a of the condenser lens 36 through the image-forming optical system 30X. Hence, it can shape the intensity distribution of laser light into a given intensity distribution and control the wavefront of the laser light at the same time.

Figure 10:
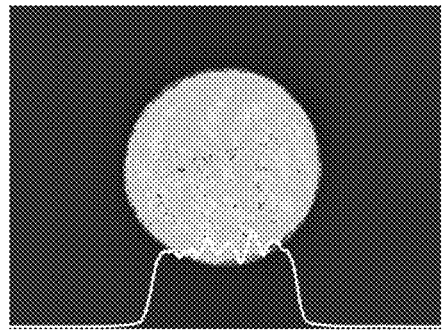
FIG. 10 is a diagram illustrating results of measurement of the intensity distribution on a pupil plane of a condenser lens.

The spatial mode (intensity distribution) on the pupil plane 36a of the condenser lens 36 was measured by the beam profiler 42 through the image-forming lens system 41 in the laser light shaping and wavefront controlling optical system 1Y in accordance with the second comparative example. FIG. 10 illustrates results of the measurement. From the results, the intensity distribution, shaped by the intensity conversion aspherical lens 24, on the desirable plane 24x was seen to be transferrable to the pupil plane 36a of the condenser lens 36 by the image-forming optical systems 28, 30X as mentioned above.

Figure 11:
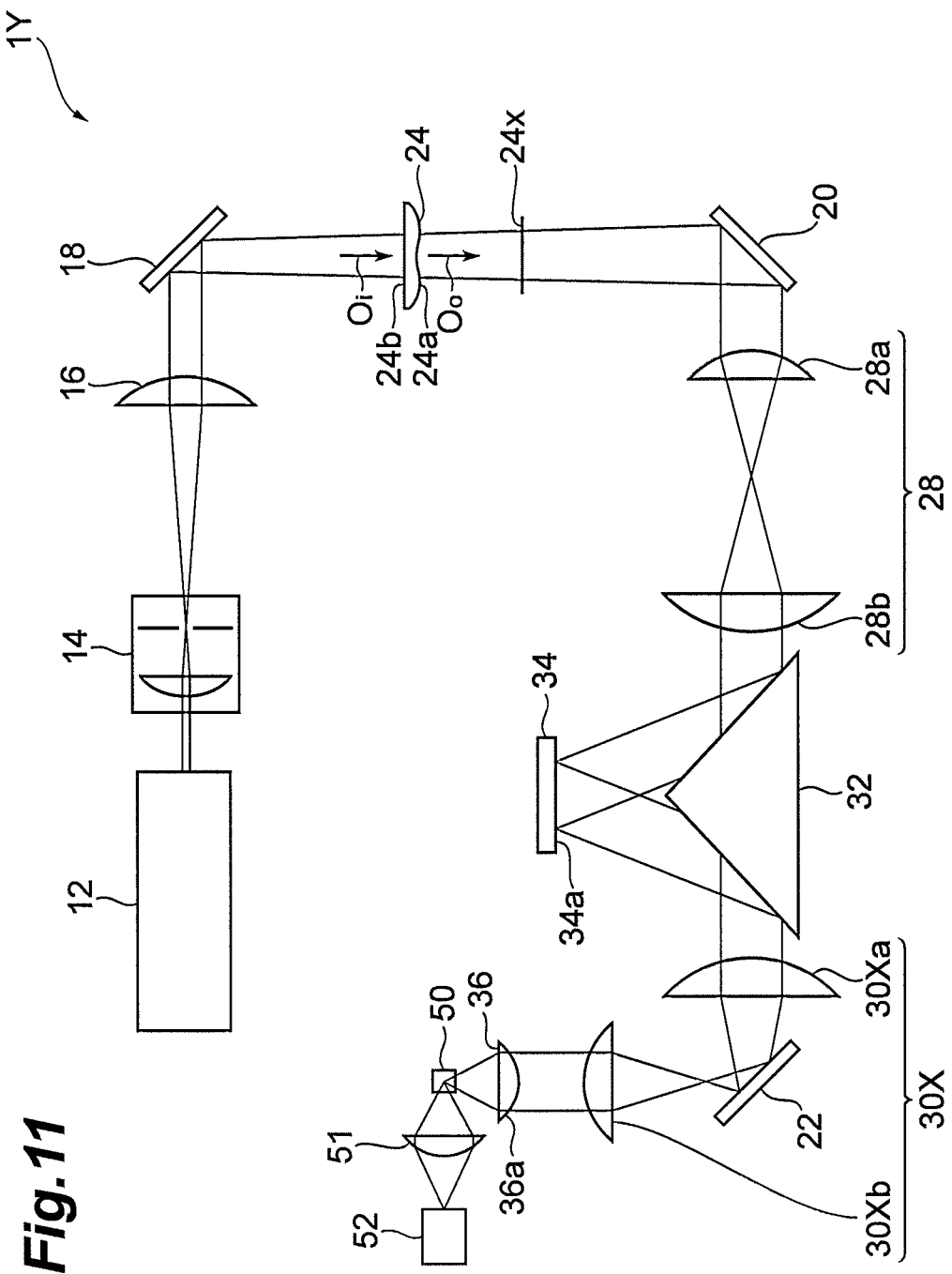
FIG. 11 is a diagram illustrating an imaging system for capturing a light-collecting characteristic within a transparent medium.
Figure 12:
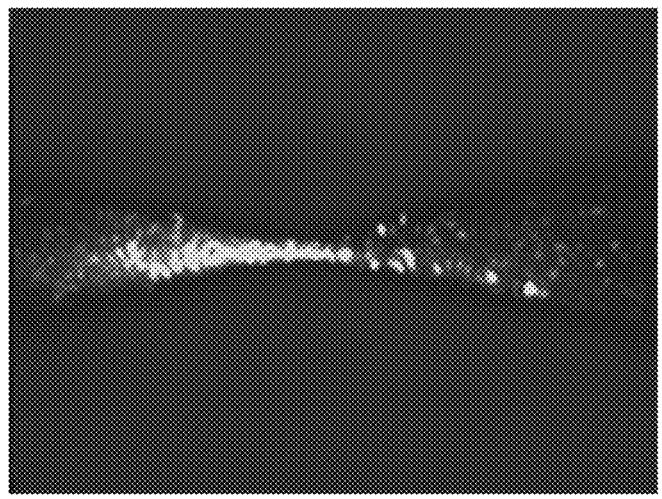
FIG. 12 is a chart illustrating results of capturing the light-collecting characteristic within the transparent medium.

As illustrated in FIG. 11, in the laser light shaping and wavefront controlling optical system 1Y in accordance with the second comparative example, a transparent material 50 was arranged in a light-collecting part of the condenser lens 36, and a light-collecting characteristic within the transparent material 50 was captured from a side face thereof by a CCD camera 52 through a lens 51. FIG. 12 illustrates the result of capture when the spherical aberration was corrected by the wavefront control by the SLM 34, from which the wavefront control was seen to function effectively also when transferring the intensity distribution shaped by the single aspherical lens 24.

As mentioned above, the intensity distribution shaped by the intensity conversion aspherical lens 24 does not change drastically when actual values deviate from designed values. It is not necessary for the wavefront controlled by the SLM 34 to be transferred precisely depending on its use.

Therefore, the inventors contrive a laser light shaping and wavefront controlling optical system which can easily shape the intensity distribution of laser light into a given intensity distribution and control the wavefront of the laser light at the same time.

First Embodiment

Figure 13:
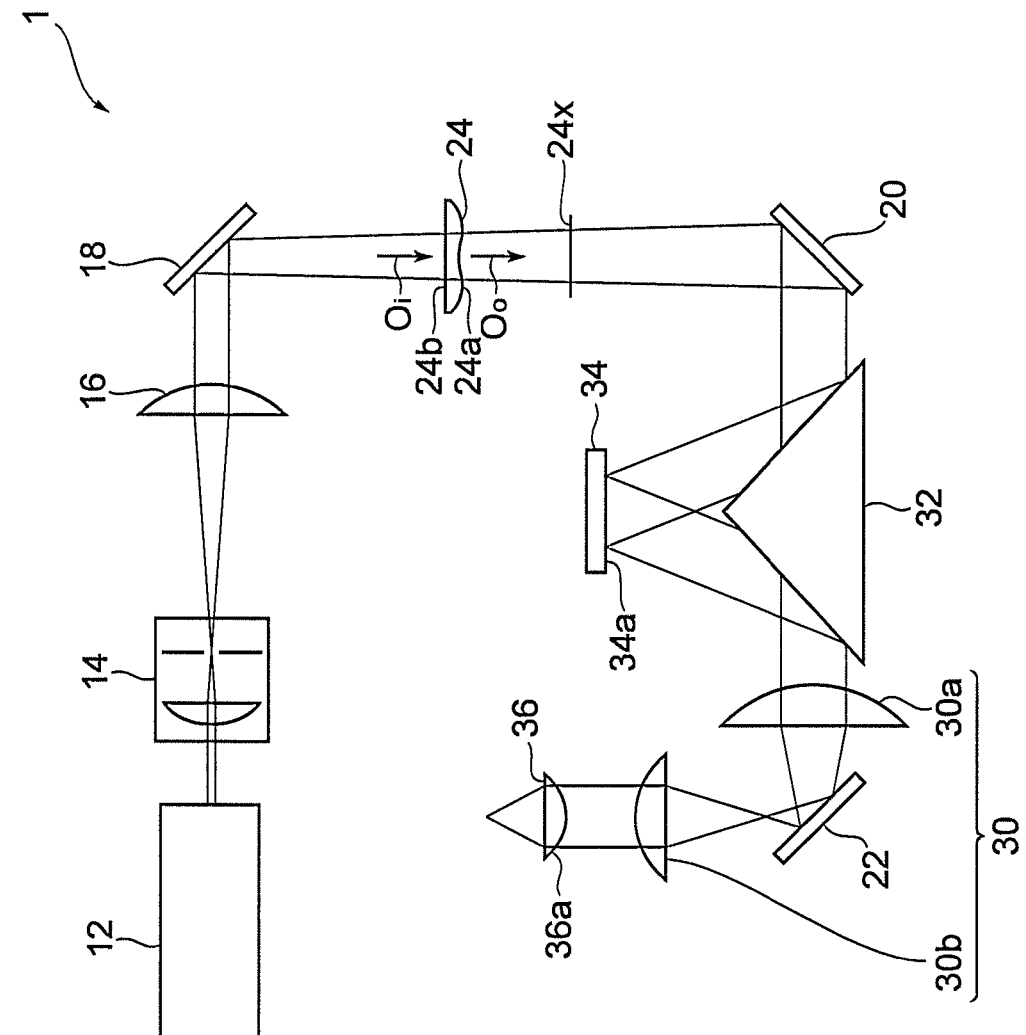
FIG. 13 is a structural diagram illustrating the laser light shaping and wavefront controlling optical system in accordance with a first embodiment of the present invention.

FIG. 13 is a structural diagram illustrating the laser light shaping and wavefront controlling optical system in accordance with the first embodiment of the present invention. The laser light shaping and wavefront controlling optical system 1 in accordance with the first embodiment structurally differs from the laser light shaping and wavefront controlling optical system 1Y in accordance with the second comparative example in that it comprises one image-forming optical system 30 in place of the two image-forming optical systems 28, 30X. The other structures of the laser light shaping and wavefront controlling optical system 1 in accordance with the first embodiment are the same as those of the laser light shaping and wavefront controlling optical system 1Y in accordance with the second comparative example.

The image-forming optical system 30 has a pair of lenses 30a, 30b and forms an image of the laser light on the entrance-side imaging plane onto the exit-side imaging plane. The entrance-side imaging plane of the image-forming optical system 30 is set on the pupil plane 36a of the condenser lens 36 as in the image-forming optical system 30X. The image-forming optical system 30 differs from the image-forming optical system 30X in that the entrance-side imaging plane is set between the desirable plane 24x where the laser light emitted from the intensity conversion aspherical lens 24 attains the desirable intensity distribution and the modulation plane 34a of the SLM 34. The reflecting mirror 22 is also arranged between the lenses 30a, 30b in this embodiment. The image-forming optical system 30 may also function as a magnifying or reducing optical system for adjusting the beam diameter of the laser light on the entrance-side imaging plane to the pupil diameter on the pupil plane 36a of the condenser lens 36. This can efficiently guide the laser light to the condenser lens 36 as mentioned above.

Since the image-forming optical system 30 has the entrance-side imaging plane between the desirable plane 24x where the laser light emitted from the intensity conversion aspherical lens 24 attains the desirable intensity distribution and the modulation plane 34a of the SLM 34, the laser light shaping and wavefront controlling optical system 1 in accordance with the first embodiment can transfer both of the desirable intensity distribution shaped by the intensity conversion aspherical lens 24 and the wavefront controlled by the SLM 34 to the pupil plane 36a of the condenser lens 36. Therefore, it can easily shape the intensity distribution of laser light into a given intensity distribution and control the wavefront of the laser light at the same time.

By homogenizing the intensity distribution of the laser light, the laser light shaping and wavefront controlling optical system 1 in accordance with the first embodiment can improve the effective NA of the condenser lens 36, whereby the spherical aberration can be corrected by utilizing the wavefront change occurring at the time of intensity conversion as explained in detail in the following.

Here, the intensity conversion aspherical lens 24, which shapes the intensity distribution of the laser light incident thereon, changes the wavefront of the incident laser light (i.e., the phase of the incident laser light) at the same time. By utilizing the change in wavefront caused by the intensity conversion aspherical lens 24, the laser light shaping and wavefront controlling optical system 1 in accordance with the first embodiment can improve the wavefront control resolution as compared with the case where the wavefront control is performed by the SLM 34 alone. These operations and effects will be verified in the following.

Figure 14:
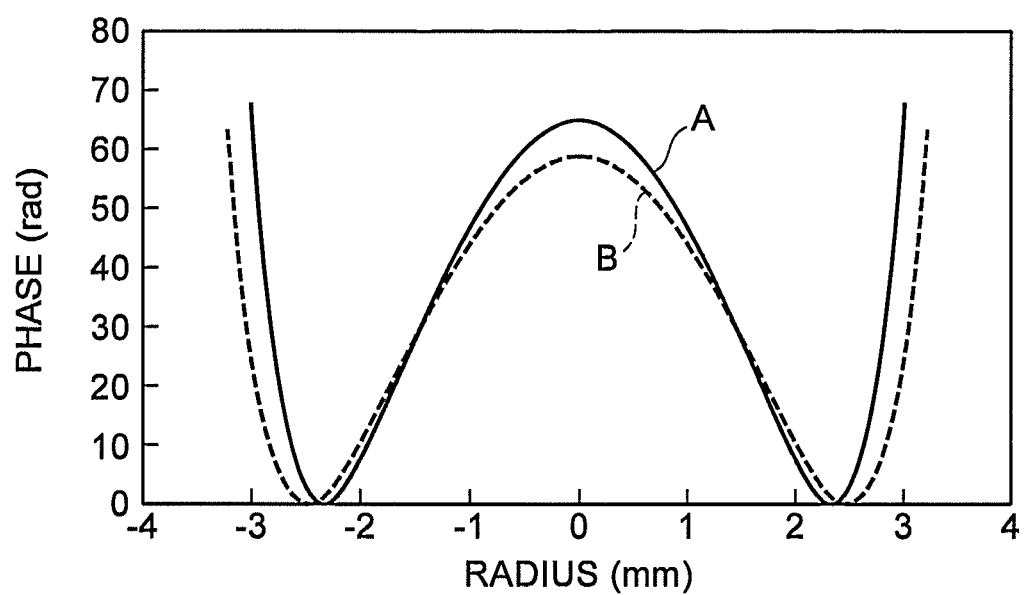
FIG. 14 is a chart illustrating a wavefront distortion generated by an intensity conversion aspherical lens.

FIG. 14 is a chart illustrating a wavefront distortion generated by the intensity conversion aspherical lens. Curve A is the wavefront distortion caused by the intensity conversion aspherical lens 24, while curve B is a correction wavefront required for correcting the spherical aberration occurring when converging laser light at a depth of 1.5 mm in synthetic silica by using an objective lens in which NA=0.8 and the focal length f=4 mm. Since these wavefronts are thus similar to each other, the wavefront change caused by the intensity conversion aspherical lens can correct the spherical aberration.

This makes it sufficient for the SLM 34 to correct the wavefront by the amount by which the wavefront caused by the intensity conversion aspherical lens 24 and the correction wavefront required for correcting the spherical aberration differ from each other. As a result, the wavefront control resolution can be improved much more as compared with the case where the spherical aberration is corrected by the SLM 34 alone.

Figure 15:
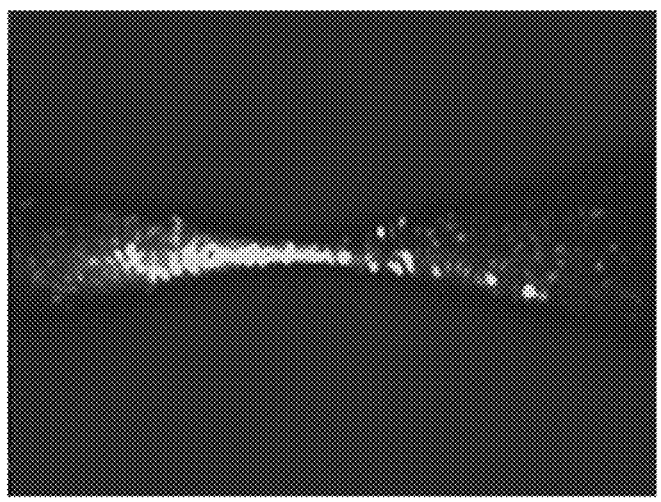
FIG. 15 is a set of charts illustrating respective light-collecting characteristics within a transparent medium in cases using the wavefront change caused by the intensity conversion aspherical lens and not.
Figure 15:
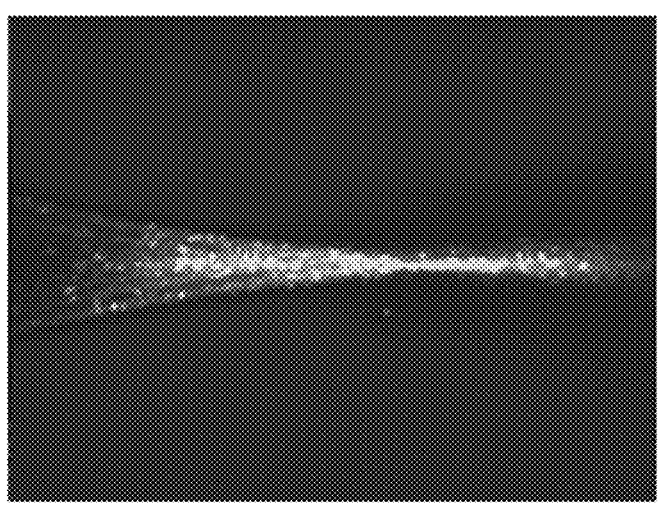

Next, the light-collecting characteristic within the transparent material in the case using the wavefront change caused by the intensity conversion aspherical lens 24 was observed. FIG. 15(a) is a chart illustrating the light-collecting characteristic in the first comparative example, i.e., in the case where the wavefront change caused by the intensity conversion aspherical lens 24 was corrected by the phase correction aspherical lens 25, while FIG. 15(b) is a chart illustrating the light-collecting characteristic in the second comparative example, i.e., in the case where the wavefront change caused by the intensity conversion aspherical lens 24 was utilized. For clarifying the spherical aberration correction effect achieved by the intensity conversion aspherical lens, the SLM 34 was not supposed to perform the wavefront correction in FIGS. 15(a) and (b). In this observation, as in FIG. 11, the transparent material 50 was arranged in the light-collecting part of the condenser lens 36, and the light-collecting characteristic within the transparent material 50 was captured from a side face thereof by the CCD camera 52 through the lens 51. From this, the distortion of the light-collecting part caused by the spherical aberration was seen to improve when the intensity conversion aspherical lens was used alone.

Second Embodiment

FIG. 16 is a structural diagram illustrating the laser light shaping and wavefront controlling optical system in accordance with the second embodiment of the present invention. The laser light shaping and wavefront controlling optical system 1A in accordance with the second embodiment structurally differs from the laser light shaping and wavefront controlling optical system 1 in accordance with the first embodiment in that it comprises the homogenizer 26 in place of the intensity conversion aspherical lens 24. That is, the laser light shaping and wavefront controlling optical system 1A in accordance with the second embodiment structurally differs from the laser light shaping and wavefront controlling optical system 1 in accordance with the first embodiment in that it further comprises the phase correction aspherical lens 25. The other structures of the laser light shaping and wavefront controlling optical system 1A in accordance with the second embodiment are the same as those in the laser light shaping and wavefront controlling optical system 1 in accordance with the first embodiment.

As mentioned above, the phase correction aspherical lens 25, which is used for correcting the laser light shaped by the intensity conversion aspherical lens 24 into a plane wave by homogenizing the phase thereof, is arranged on the desirable plane 24x where the laser light emitted from the intensity conversion aspherical lens 24 attains the desirable intensity distribution.

As with the laser light shaping and wavefront controlling optical system 1 in accordance with the first embodiment, the laser light shaping and wavefront controlling optical system 1A in accordance with the second embodiment can transfer the desirable intensity distribution shaped by the intensity conversion aspherical lens 24 and the wavefront controlled by the SLM 34 to the pupil plane 36a of the condenser lens 36. Therefore, it can easily shape the intensity distribution of laser light into a given intensity distribution and control the wavefront of the laser light at the same time.

As mentioned above, the first embodiment comprising the intensity conversion aspherical lens 24 alone without the phase correction aspherical lens 25 can utilize the wavefront change caused by the intensity conversion aspherical lens 24 and thus is effective in correcting the spherical aberration. However, when no aberration correction is necessary, as in the case of multipoint-processing a material surface, the second embodiment further comprising the phase correction aspherical lens 25 is effective. When the first embodiment using the intensity conversion aspherical lens 24 alone is employed in the case of multipoint-processing a material surface, it is necessary for the SLM 34 to correct the wavefront change caused by the intensity conversion aspherical lens 24 and control the wavefront change for forming multiple points. This increases the amount of wavefront control achieved by the SLM 34.

In the second embodiment further comprising the phase correction aspherical lens 25, by contrast, the phase correction aspherical lens 25 corrects the laser light issued from the intensity conversion aspherical lens 24 into the plane wave by homogenizing the phase thereof, whereby it is only necessary for the SLM 34 to attain the wavefront change for forming the multiple points. Therefore, the amount of wavefront control achieved by the SLM 34 does not increase.

The present invention can be modified in various ways without being restricted to the above-mentioned embodiments. For example, since the wavefront (amount of phase modulation) controllable by the SLM is limited, the resolution of the SLM may be insufficient when the amount of phase modulation is large, whereby the desirable wavefront is hard to achieve sufficiently. In this case, this embodiment may cause the SLM 34 to achieve a display folded by $2\pi$ or an even multiple of $2\pi$.

In the first embodiment, the desirable plane 24x where the laser light emitted from the intensity conversion aspherical lens 24 attains the desirable intensity distribution may be designed so as to be located on the modulation plane 34a of the SLM 34. In this case, setting the entrance-side imaging plane of the image-forming optical system 30 on the modulation plane 34a of the SLM 34 can precisely transfer both of the intensity distribution, shaped by the intensity conversion aspherical lens 24, on the SLM 34 and the wavefront controlled by the SLM 34 onto the pupil plane 36a of the condenser lens 36.

In the first embodiment, the intensity conversion aspherical lens 24 may be equipped with a function as a magnifying optical system provided by the image-forming optical system 28 in the comparative example. That is, the intensity conversion aspherical lens 24 may have a function to magnify the beam diameter of the laser light such as to adjust it to the size of the modulation plane 34a of the SLM 34. This makes it possible to utilize the pixel region in the modulation plane 34a of the SLM 34 effectively.

In the first embodiment, the beam diameter (wavefront) necessary for desirably correcting the spherical aberration may be achieved by the intensity conversion aspherical lens 24 alone depending on how the latter is designed. When the beam diameter (wavefront) required for desirably correcting the spherical aberration is hard to be achieved by the intensity conversion aspherical lens 24 alone, on the other hand, it is necessary for the beam diameter of the laser light incident on the intensity conversion aspherical lens 24 and the beam diameter of the laser light emitted therefrom (the laser light after the intensity conversion) to attain appropriate values. For this purpose, a magnifying or reducing optical system may be arranged in front of the intensity conversion aspherical lens 24.

On the other hand, when causing the SLM 34 to actively control the wavefront of the laser light emitted from the intensity conversion aspherical lens 24 in the first embodiment, matching the modulated light and the size of the modulation plane 34a of the SLM 34 to each other can effectively utilize the pixel region of the SLM 34. For this purpose, a magnifying or reducing optical system may be arranged in front of the intensity conversion aspherical lens 24.

INDUSTRIAL APPLICABILITY

The present invention can be employed for uses which can easily shape the intensity distribution of laser light into a given intensity distribution and control the wavefront of the laser light at the same time.

| Reference Signs List | |
|---|---|
| 1, 1A, 1X, 1Y | laser light shaping and wavefront controlling optical system |
| 12 | laser light source |
| 14 | spatial filter |
| 16 | collimator lens |
| 18, 20, 22 | reflecting mirror |
| 24 | intensity conversion aspherical lens (intensity conversion lens) |
| 24x | plane where the laser light emitted from the intensity conversion lens attains a desirable intensity distribution |
| 25 | phase correction aspherical lens (phase correction lens) |
| 26 | homogenizer |
| 28, 30, 30X | image-forming optical system |
| 32 | prism |
| 34 | spatial light modulator (SLM: optical modulation device) |
| 34a | modulation plane |
| 36 | condenser lens (condenser optical system) |
| 36a | pupil plane |

-continued

| Reference Signs List | |
|---|---|
| 41 | image-forming lens system |
| 42 | beam profiler |
| 50 | transparent material |
| 51 | lens |
| 52 | CCD camera |

The invention claimed is:

1. A laser light shaping and wavefront controlling optical system comprising:
 an intensity conversion lens for converting and shaping an intensity distribution of laser light incident thereon into a desirable intensity distribution;
 an optical modulation device for modulating the laser light emitted from the intensity conversion lens so as to control a wavefront thereof;
 a condenser optical system for converging the laser light issued from the optical modulation device; and
 an image-forming optical system, arranged between the optical modulation device and the condenser optical system, having an entrance-side imaging plane between a plane where the laser light emitted from the intensity conversion lens attains the desirable intensity distribution and a modulation plane of the optical modulation device and an exit-side imaging plane in the condenser optical system.

2. A laser light shaping and wavefront controlling optical system according to claim 1, wherein the plane where the laser light emitted from the intensity conversion lens attains the desirable intensity distribution is located on the modulation plane of the optical modulation device, and
 wherein the image-forming optical system has the entrance-side imaging plane on the modulation plane of the optical modulation device.

3. A laser light shaping and wavefront controlling optical system according to claim 1, further comprising a phase correction lens, arranged on the plane where the laser light emitted from the intensity conversion lens attains the desirable intensity distribution, for correcting the laser light emitted from the intensity conversion lens into a plane wave by homogenizing a phase thereof.

* * * * *